US009073443B2

(12) United States Patent
Baier et al.

(10) Patent No.: US 9,073,443 B2
(45) Date of Patent: Jul. 7, 2015

(54) MOTOR VEHICLE DEVICE HAVING A CHARGING AND/OR DISCHARGING UNIT

(75) Inventors: Karlheinz Baier, Ostfildern (DE); Matthias Kronewitter, Esslingen (DE); Thomas Weber, Herrenberg (DE)

(73) Assignee: Daimler AG, Stuttgart (DE)

( * ) Notice: Subject to any disclaimer, the term of this patent is extended or adjusted under 35 U.S.C. 154(b) by 51 days.

(21) Appl. No.: 13/994,578

(22) PCT Filed: Nov. 12, 2011

(86) PCT No.: PCT/EP2011/005705
§ 371 (c)(1),
(2), (4) Date: Jul. 26, 2013

(87) PCT Pub. No.: WO2012/079668
PCT Pub. Date: Jun. 21, 2012

(65) Prior Publication Data
US 2013/0304298 A1    Nov. 14, 2013

(30) Foreign Application Priority Data

Dec. 17, 2010   (DE) .......................... 10 2010 054 909

(51) Int. Cl.
*B60L 11/18*        (2006.01)
(52) U.S. Cl.
CPC .......... *B60L 11/1829* (2013.01); *Y02T 10/7005* (2013.01); *B60L 11/182* (2013.01); *B60L 11/1833* (2013.01); *Y02T 90/125* (2013.01); *Y02T 90/12* (2013.01); *Y02T 90/14* (2013.01); *Y02T 90/122* (2013.01); *Y02T 90/121* (2013.01)

(58) Field of Classification Search
CPC . Y02T 10/7005; Y02T 90/122; Y02T 90/125; Y02T 90/12; Y02T 90/14; Y02T 10/7088; B60L 11/182; B60L 11/1829; B60L 11/1833
USPC ............................................. 701/22; 320/108
See application file for complete search history.

(56) References Cited

U.S. PATENT DOCUMENTS 3,914,562 A     10/1975  Bolger
5,654,621 A *   8/1997   Seelig ........................... 320/108
6,421,600 B1 *  7/2002   Ross ............................. 701/117

FOREIGN PATENT DOCUMENTS

DE           196 41 254 A1    4/1998

OTHER PUBLICATIONS

International Search Report dated Apr. 26, 2013 w/ English translation (four (4) pages).

* cited by examiner

*Primary Examiner* — Mary Cheung
*Assistant Examiner* — Brian P Sweeney
(74) *Attorney, Agent, or Firm* — Crowell & Moring LLP

(57) ABSTRACT

An electric and/or hybrid motor vehicle device includes a charge and/or discharge unit, which has a vehicle-side energy transfer unit for touch-free coupling with at least one corresponding external energy transfer unit for charging and/or discharging at least one battery device. The motor vehicle also includes a motor vehicle level-adjustment unit that is provided to adjust at least two different motor vehicle heights. The adjustment unit is provided to adjust a gap between the at least two energy transfer units to a charge level during a charging and/or discharging process.

12 Claims, 1 Drawing Sheet

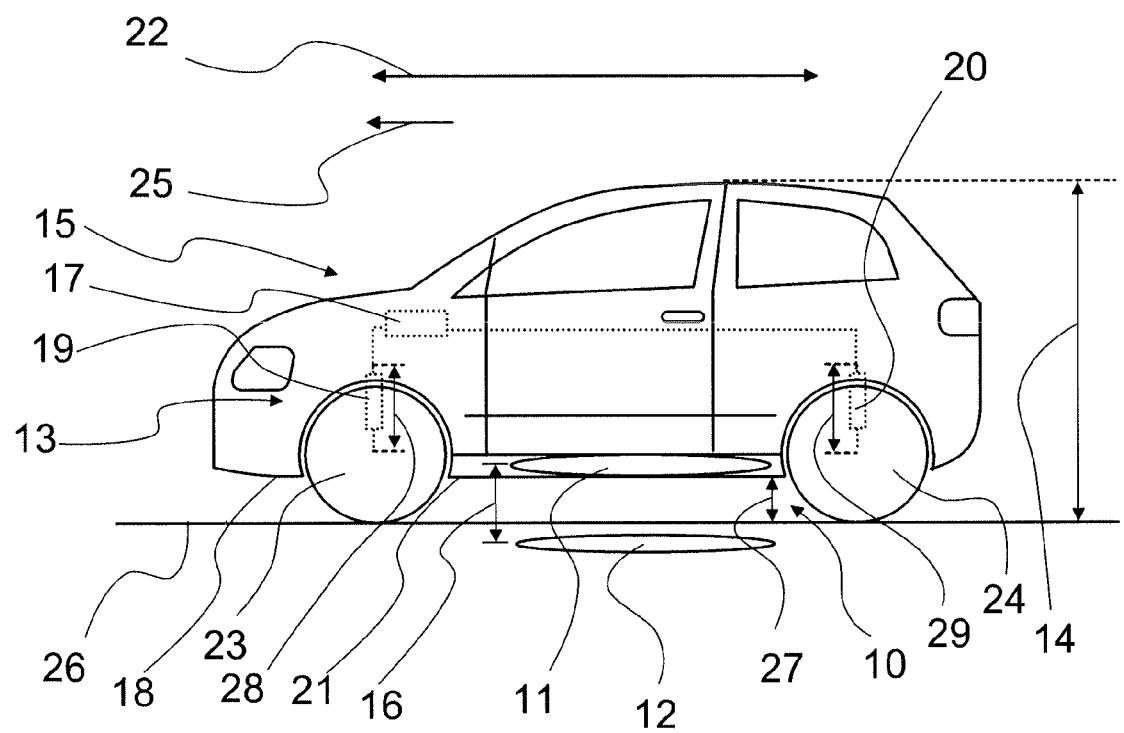

MOTOR VEHICLE DEVICE HAVING A CHARGING AND/OR DISCHARGING UNIT

BACKGROUND AND SUMMARY OF THE INVENTION

The invention relates to a motor vehicle device.

U.S. Pat. No. 3,914,562 discloses a motor vehicle device, in particular an electric and/or hybrid motor vehicle device, having a charge and/or discharge unit, which has at least one vehicle-side energy transfer unit for touch-free coupling with a corresponding external energy transfer unit for charging and/or discharging at least one battery device.

Exemplary embodiments of the present invention are directed to a constructively simple motor vehicle device, which has a charge and/or discharge unit with a high level of output.

The invention is based on a motor vehicle device, in particular on an electric and/or hybrid motor vehicle device, having a charge and/or discharge unit, which has at least one vehicle-side energy transfer unit for touch-free coupling with at least one corresponding external energy transfer unit for charging and/or discharging at least one battery device, and having a motor vehicle level-adjustment unit that is provided to adjust at least two different motor vehicle heights.

In accordance with the present invention, the motor vehicle device has an adjustment unit, which is provided, for a charging and/or discharging process, to adjust a gap between the at least two energy transfer units to a charge level by means of the motor vehicle level-adjustment unit. Thus, the gap between the energy transfer units can be varied, whereby a good, in particular an optimal, operating point of the charge and/or discharge unit can be adjusted and thus a charge and/or discharge output in the charging and/or discharging process can be increased. By adjusting the charge level by means of the motor vehicle level-adjustment unit, additional, in particular additional moving components, such as additional kinematics for moving the vehicle-side energy transfer unit and/or the external energy transfer unit, can in particular be dispensed with, whereby a constructively simple motor vehicle device can be provided, which has a charge and/or discharge unit with a high level of output.

"Energy transfer unit" should be understood as a unit that can receive and/or send electrical energy in a touch-free and/or contact-free and/or cable-free manner. Preferably, two energy transfer units are provided for touch-free and/or contact-free and/or cable-free transfer of electrical energy over a defined distance to each other. Each energy transfer unit preferably has at least one coil. The at least one vehicle-side energy transfer unit and the at least one external energy transfer unit are preferably separated mechanically from each other. "Touch-free coupling" is to be understood here in particular as an electromagnetic, preferably inductive coupling. The vehicle-side energy transfer unit can advantageously be coupled with various, in particular corresponding and/or similar external energy transfer units in a touch-free manner, i.e. the touch-free coupling is preferably not limited to a specific and/or fixed external energy transfer unit.

"Charge and/or discharge output" should be understood as an output and/or electrical energy that is assigned to the charging and/or discharging process. The charge and/or discharge output for charging and/or discharging the battery device is preferably provided. "Battery device" should be understood as a device for the temporary storage of electrical energy. "Charging process" should be understood as a process in which the charge and/or discharge unit supplies electrical energy to the at least one battery device. In the charging process, the battery device of the motor vehicle is preferably connected functionally to an external energy source via both energy transfer units, wherein the battery device is charged with electrical energy from the external energy source. "Discharging process" should be understood as a process in which the charge and/or discharge unit discharges electrical energy from the at least one battery device of the motor vehicle. In the discharging process, the battery device of the motor vehicle is preferably functionally connected to the external energy source, wherein the battery device is discharged by the external energy source and energy and/or power from the battery is thereby fed into the external energy source. The external energy source is advantageously designed as an external power grid. The external energy source can fundamentally also be designed as a battery device. Advantageously, in the charging and/or discharging process, the energy between both energy transfer units is transferred inductively as a magnetic alternating field without direct electrical contact.

"Motor vehicle level-adjustment unit" should be understood as a unit that enables an optimal ride height, in particular when the motor vehicle is being loaded, to be guaranteed in particular partially automatically and/or completely automatically. The motor vehicle level-adjustment unit preferably adjusts a gap between a motor vehicle body of the motor vehicle and a rotational axis of drive wheels of the motor vehicle and/or between the motor vehicle body and a fraction surface. The motor vehicle level-adjustment unit is preferably designed as a level-regulation element of the motor vehicle. "Motor vehicle body" should be understood as a unit made from load-bearing components of the motor vehicle, which, in its entirety, absorbs forces introduced into the motor vehicle, such as weight forces of persons located in the motor vehicle and/or of loads located in the motor vehicle such as luggage or similar, while at the same time having a protective function, at least for the persons located in the motor vehicle. "Traction surface" should be understood as a surface on which the drive wheels of the motor vehicle rest in a normal driving state, whereby an existing drive force of the motor vehicle is converted into a propulsion force and transferred to the surface. "Motor vehicle body" should be understood as a non-self-supporting body with a chassis, which together form a unit.

"Charge level" should be understood as a gap between the vehicle-side energy transfer unit and the external energy transfer unit, in which the charging and/or discharging process takes place. Preferably, the charge and/or discharge output is dependent on the charge level. The charge level is advantageously an optimized gap between both energy transfer units, wherein the charge and/or discharge output is optimized. The charge level is advantageously smaller than a gap between both energy transfer units during the normal driving state of the motor vehicle. The charge level preferably defines an operating point of the charge and/or discharge unit. The battery device of the motor vehicle can advantageously be charged and/or discharged efficiently with respect to the charge level. The charge level is preferably designed as a charge and/or discharge level. "Adjustment unit" should be understood as a unit that adjusts the gap between the vehicle-side energy transfer unit and the external energy transfer unit for the charging process and/or the discharging process to the charge level. "Provided" should be understood as specially programmed, configured and/or equipped.

Furthermore, the adjustment unit can have a control and/or regulation unit, which is provided for the automatic and/or partially automatic adjustment of the charge level by means of the motor vehicle level-adjustment unit. In this way, the gap between the vehicle-side energy transfer unit and the external energy transfer unit can be adjusted to the charge level in a particularly comfortable manner. "Control and/or regulation unit" should be understood as a unit with at least one control device. "Control device" should be understood as a unit with a processor unit and with a storage unit, as well as with an operating program stored in the storage unit. The control and/or regulating unit can fundamentally have several control devices connected beneath one another, which are preferably provided to communicate with one another via a bus system such as a CAN bus system.

In a further embodiment according to the invention, the control and/or regulation unit has a regulatory operating mode that is provided to adjust the charge level for the charging and/or discharging process depending at least on a charge and/or discharge output of the charge and/or discharge unit. Due to this, the gap between the vehicle-side energy transfer unit and the external energy transfer unit can be regulated to an optimal charge level, whereby an optimal operating point of the charge and/or discharge unit can be adjusted. Preferably, by adjusting the charge level depending on the charge and/or discharge output, an optimal charge level for an external energy transfer unit used for the charging and/or discharging process can be determined, whereby a flexibility of the charge and/or discharge unit can be increased. "Adjusting depending on a charge and/or discharge output" should be understood as a regulation.

Furthermore, the control and/or regulation unit can have a control operating mode that is provided to adjust the charge level for the charging and/or discharging process, independent of a charge and/or discharge output of the charge and/or discharge unit. In this way, the gap between the vehicle-side energy transfer unit and the external energy transfer unit can be adjusted to a charge level in a particularly simple manner. "Adjusting depending on a charge and/or discharge output" should be understood as a control.

Additionally, the control and/or regulation unit can be provided at least in the control operating mode to adjust the charge level for the charging and/or discharging process to a fixed value of the charge level. Thus an adjustment of the gap between the vehicle-side energy transfer unit and the external energy transfer unit, which is independent of the charge and/or discharge output, can be implemented in a particularly simple manner. It is preferred for the fixed value of the charge level to be stored in the storage unit of the control and/or regulation unit. Advantageously, the fixed value is adjusted to the motor vehicle having the motor vehicle device and/or to an external energy transfer unit. Preferably, several values of the charge level can be fixed in the storage unit, which are each adjusted to an external energy transfer unit and/or to an external environment, for example to air humidity. The control and/or regulation unit here advantageously adjusts the charge level to the fixed value, which is in turn adjusted to the used external energy transfer unit and/or to the present external environment. For the detection of the external energy transfer unit used for charging and/or discharging and/or of the external environment, the motor vehicle device preferably has a sensor system. A "sensor system" should be understood to be a unit that detects a physical size and emits a sensor signal that is dependent on the physical size. A "sensor signal" should be understood as an electrical and/or electronic signal, which is emitted from the sensor system and is then preferably evaluated by an electronic evaluation unit. Here, the sensor signal is preferably dependent on a physical size, and changes when the physical size changes. The evaluation unit is advantageously designed integrally with the control and/or regulation unit, i.e. the control and/or regulation unit contains the evaluation unit.

It is particularly advantageous if the charge and/or discharge unit has a sensor system and the control and/or regulation unit is provided to activate the charging and/or discharging process automatically, depending on the sensor system. This increases the user-friendliness of the motor vehicle device.

Furthermore, it is advantageous if the motor vehicle device has a motor vehicle body that is connected tightly to the vehicle-side energy transfer unit. Thus, the adjustment of the gap between the vehicle-side energy transfer unit and the external energy transfer unit to the charge level can be carried out in a constructively simple manner by means of the motor vehicle level-adjustment unit. In this context, "connected tightly" should be understood in that the vehicle-side energy transfer unit is arranged in a fixed manner on the motor vehicle body relative to the motor vehicle body.

It is particularly preferred if the motor vehicle level-adjustment unit is designed hydraulically and/or pneumatically and if the adjustment unit for adjusting the charge level is provided to adjust at least one operating resource parameter of the motor vehicle level-adjustment unit. Thus, a particularly advantageous motor vehicle level-adjustment unit can be provided. The operating resource parameter is, for example, designed as a number of operating resources, a volume of operating resources and/or an operating resource pressure and/or similar.

Moreover, the motor vehicle level-adjustment unit can have at least one undercarriage component for adjusting the charge level. Thus, the adjustment of the gap between the vehicle-side energy transfer unit and the external energy transfer unit can be carried out in a particularly simple manner. Preferably, the at least one undercarriage component is designed as a hydro-pneumatic shock absorber.

Further advantages arise from the following description of the FIGURE. An exemplary embodiment of the invention is depicted in the FIGURE. The FIGURE, the description and the claims contain numerous features in combination. The person skilled in the art will also necessarily consider the features individually and will integrate them into further worthwhile combinations.

BRIEF DESCRIPTION OF THE DRAWING FIGURES

FIG. 1 shows a schematically depicted motor vehicle having a motor vehicle device according to the invention.

DETAILED DESCRIPTION

FIG. 1 shows a schematically depicted motor vehicle having a motor vehicle device according to the invention. The motor vehicle is designed as an electric motor vehicle. For the purpose of drive, the motor vehicle has a drive train (not depicted) with at least one electric motor. The motor vehicle device is designed as an electric motor vehicle device. Fundamentally, the motor vehicle can be designed as a hybrid motor vehicle and the motor vehicle device can thus be designed as a hybrid motor vehicle device. Here, the motor vehicle that is designed as a hybrid motor vehicle has at least one internal combustion engine in the drive train in addition to the at least one electric motor.

To supply the electric motor with energy, the motor vehicle has a battery device that is not depicted in greater detail. The battery device provides the energy for driving the motor vehicle by means of the electric motor. The motor vehicle that is designed as a hybrid motor vehicle may also have a battery device, which provides energy for supplying the electric motor. The battery device is designed as a traction battery.

The motor vehicle device has a charge and discharge unit 10 for charging and discharging the battery device. The charge and discharge unit 10 is designed as an induction charge and discharge unit. It is also possible for the motor vehicle device to only have a charge device or a discharge device. The motor vehicle that has the charge and discharge device 10 can serve, for example, as an energy buffer in an energy supply system.

The charge and discharge device 10 has a vehicle-side energy transfer unit 11 for touch-free and cable-free coupling of the charge and discharge device 10 to an external energy source. The battery device of the motor vehicle can be charged and/or discharged using the touch-free and cable-free coupling of the charge and discharge device 10 to the external energy source. The vehicle-side energy transfer unit 11 is connected tightly to the motor vehicle. The vehicle-side energy transfer unit 11 is connected non-displaceably to a motor vehicle body 18. It is integrated tightly in the motor vehicle. The vehicle-side energy transfer unit 11 is connected tightly to the motor vehicle body 18 and is thus arranged immovably relative to the motor vehicle body 18. The vehicle-side energy transfer unit 11 is applied to a motor vehicle undercarriage 21 of the motor vehicle.

The vehicle-side energy transfer unit 11 is arranged between front wheels 23 and rear wheels 24 of the motor vehicle with respect to a main extension direction 22 of the motor vehicle. The vehicle-side energy transfer unit 11 is arranged between two planes that are set up perpendicular to the main extension direction 22, wherein, a rotational axis of the front wheels 23 runs in one plane and a rotational axis of the rear wheels 24 runs in another plane. The main extension direction 22 is set up parallel to a travelling direction 25 of a motor vehicle that is driving straight on. The vehicle-side energy transfer unit 11 is connected to the battery device via at least one conductor strand. The vehicle-side energy transfer unit 11 is designed as a mobile energy transfer unit. It is essentially also conceivable for the vehicle-side energy transfer unit 11 to be applied to another point of the motor vehicle.

To implement touch-free and cable-free coupling of the charge and discharge device 10 with the external energy source, the external energy source has an external energy transfer unit 12. The external energy transfer unit 12 is designed correspondingly to the vehicle-side energy transfer unit 11. The external energy transfer unit 12 is connected electrically to the external energy source. In a charging process of the battery device of the motor vehicle, the external energy transfer unit 12 is designed as an energy transmission unit. In a discharging process of the battery device of the motor vehicle, the external energy transfer unit 12 is designed as an energy receiver unit. The external energy source is designed as an external power grid, for example as a typical mains grid. The external energy source can also essentially be designed as another energy source that appears to be sensible to the person skilled in the art, such as an external energy storage unit, in particular an external battery device, which is optionally coupled to an external power grid and/or decoupled from an external power grid.

The external energy transfer unit 12 is designed as a stationary energy transfer unit. It is applied in an environment, for example a garage or another location, which can be reached easily with the motor vehicle. In this exemplary embodiment, the external energy transfer unit 12 is arranged beneath a traction surface 26. The external energy transfer unit 12 can essentially be arranged partially beneath or above the traction surface 26. The traction surface 26 is designed as a driving surface or as a covering layer and thus as an upper part of a road surface. The traction surface 26 can be designed, for example, as an asphalt road cover, a concrete road cover, a paved road cover etc. It is essentially also conceivable for the external energy transfer unit 12 to be arranged at another position, for example on a wall. For this, the vehicle-side energy transfer unit 11 arranged in the motor vehicle would have to be applied accordingly to the motor vehicle so as to enable coupling of both energy transfer units 11, 12.

The vehicle-side energy transfer unit 11 is provided for touch-free and cable-free coupling with the corresponding external energy transfer unit 12. Both energy transfer units 11, 12 are provided for contact-free, inductive coupling with each other. They are provided for transformer coupling. The vehicle-side energy transfer unit and the external energy transfer unit are coupled to each other in a touch-free manner during the charging and/or discharging process.

Due to inductive coupling, the vehicle-side energy transfer unit 11 transfers, during the charging process, an electrical output from the external energy source to the battery device of the motor vehicle with induction by means of the external energy transfer unit 12. Thus, the battery device is charged by the charge and discharge device 10. Due to inductive coupling during the discharge process the vehicle-side energy transfer unit 11 transfers an electrical output from the battery device of the motor vehicle to the external energy source with induction by means of the external energy transfer unit 12. Thus, the battery device is discharged by the charge and discharge device 10. Electrical output can be transferred from one of the energy transfer units 11, 12 to the other energy transfer unit 12, 11 by means of inductive coupling during the charging and/or discharging process. The electrical output transferred during the charging and/or discharging process is characterized as charge and/or discharge output.

The vehicle-side energy transfer unit 11 and the external energy transfer unit 12 each have at least one coil (not depicted) for inductive coupling. The coil of the vehicle-side energy transfer unit 11 is designed as a vehicle coil. The coil of the external energy transfer unit 12 is designed as a ground coil. The coils of the energy transfer units 11, 12 are each provided either to generate a magnetic field or convert a magnetic field into a current. During the charge process, the vehicle-side energy transfer unit 11 is designed as an energy receiver unit. During the discharge process, the vehicle-side energy transfer unit 11 is designed as an energy transmission unit.

For a charging and/or discharging process of the battery device, both energy transfer units 11, 12 are arranged directly above each other. To that end, the motor vehicle is positioned in such a way that the vehicle-side energy transfer unit 11, which is fastened tightly on the motor vehicle undercarriage 21, is arranged directly above the external energy transfer unit 12 that is applied in a fixed manner. The more exactly the vehicle-side energy transfer unit 11 is applied above the external energy transfer unit 12, the more efficient the transfer of the electrical output is, i.e. the greater the charge and/or discharge output is.

During the charge process of the battery device of the motor vehicle, the external energy transfer unit 12 that is designed as an energy transmission unit generates a magnetic field by means of current from the external energy source. During the charge process, the coil of the vehicle-side energy transfer unit 11 is penetrated by the magnetic field, which is generated by the external energy transfer unit 12. The magnetic field generates a current in the coil of the vehicle-side energy transfer unit 11. The current in the coil of the vehicle-side energy transfer unit 11 is fed into the battery device via the conductor strand. The battery device of the motor vehicle is thus charged in a contact-free manner by the external energy source via the energy transfer units 11, 12.

In contrast with the charge process, during the discharge process of the battery device, an energy flow is reversed. The vehicle-side energy transfer unit 11 generates a magnetic field during a discharge process by means of current from the battery device of the motor vehicle. The magnetic field of the coil of the vehicle-side energy transfer unit 11 penetrates the coil of the external energy transfer unit 12. The magnetic field generates a current in the coil of the external energy transfer unit 12. The current generated by the external energy transfer unit 12 is fed into the external energy source. Thus, the motor vehicle can be used as an energy storage unit for the external energy source. For example, by using several motor vehicles as energy storage units, energy peaks could be absorbed in an external energy supply grid.

The motor vehicle device has a motor vehicle level-adjustment unit 13 for adjusting different motor vehicle heights 14 of the motor vehicle. The motor vehicle height 14 here is the gap between a highest point of the motor vehicle, compared to the traction surface 26, and the traction surface 26. The motor vehicle level-adjustment unit 13 is provided to regulate the level of the motor vehicle. A ride height 27 can be adjusted and/or adapted using the motor vehicle level-adjustment unit 13. The ride height 27 corresponds to a gap between the motor vehicle undercarriage 21 and the traction surface 26.

The motor vehicle level-adjustment unit 13 is designed as a hydro-pneumatic motor vehicle level-adjustment unit. The motor vehicle level-adjustment unit 13 has four chassis components 19, 20 for implementing the hydro-pneumatic motor vehicle level-adjustment unit 13. The chassis components 19, 20 are each designed as a hydro-pneumatic chassis component. The chassis components 19, 20 each have an operating resource volume. Due to a number of operating resources in the operating resource volume, a length 28, 29 of each chassis component 19, 20 can be adjusted. By altering the length 28, 29 of the chassis components 19, 20, the motor vehicle height 14, and thus the ride height 27, change. Altering the length 28, 29 of the chassis components 19, 20 causes a movement of the motor vehicle body 18 with respect to the rotational axes of the front wheels 23 and the rear wheels 24. Altering the length 28, 29 of the chassis components 19, 20 corresponds to an alteration of the ride height 27.

Two chassis components 19 here are each assigned to a front wheel 23 and two chassis components 20 are each assigned to a rear wheel 24. In FIG. 1 only two of the four chassis components 19, 20 can be seen. The chassis components 19, 20 are each designed as a hydro-pneumatic shock absorber. It is also possible to design the motor vehicle level-adjustment unit 13 or the chassis components 19, 20 purely pneumatically, purely hydraulically or electrically. An electrically designed motor vehicle level-adjustment unit 13 or an electrically designed chassis component 19, 20 can be implemented, for example, by means of a screw thread, such as in coilover suspension.

The motor vehicle device has an adjustment unit 15 for adjusting a gap 16 between the vehicle-side energy transfer unit 11 and the external energy transfer unit 12 for the charging and/or discharging process to a charge level. The adjustment unit 15 adjusts the gap 16 of the energy transfer units 11, 12 to the charge level by means of the motor vehicle level-adjustment unit 13. The gap 16 is designed as a vertical gap between the vehicle-side energy transfer unit 11 and the external energy transfer unit 12. The gap 16 is essentially set up perpendicular to the main extension direction 22. It is set up parallel to the ride height 27. The chassis components 19, 20 of the motor vehicle level-adjustment unit 13 are provided to adjust the charge level for the charging and/or discharging process. The adjustment unit 15 is provided to optimize the charge and/or discharge output of the charge and discharge device 10 by adjusting the gap 16 to the charge level, and thus to optimize an efficiency of the transfer of the electrical energy by means of both energy transfer units 11, 12. Due to the use of the motor vehicle level-adjustment unit 13 to adjust the gap 16, the charge and discharge device 10 can be set comprehensively to an optimized charge level and/or to a fixed gap 16 with low tolerance levels.

For the automatic or partially automatic adjustment of the charge level by means of the motor vehicle level-adjustment unit 13, the adjustment unit 15 has a control and regulation unit 17. The control and regulation unit 17 controls or regulates the gap 16 and thus the ride height 27 for the adjustment of the charge level. An alteration to the ride height 27 corresponds to an alternation to the gap 16, and vice versa.

The control and regulation unit 17 of the adjustment unit 15 adjusts the charge level by adjusting an operating resource parameter of the motor vehicle level-adjustment unit 13. The control and regulation unit 17 of the adjustment unit 15 adjusts, for the charging and/or discharging process, the gap 16 between both energy transfer units 11, 12 to the charge level by altering or adjusting the number of operating resources of the four chassis components 19, 20 of the motor vehicle level-adjustment unit 13.

The control and regulation unit 17 has a regulatory operating mode and a control operating mode. In the regulatory operating mode, the control and regulation unit 17 adjusts, for the charging and/or discharging process, the gap 16 to the charge level, depending on the charge and/or discharge output of the charge and discharge device 10. In the regulatory operating mode, the control and regulation unit 17 alters, for the change and/or discharge process of the battery device, the length 28, 29 of the chassis components 19, 20 and thus the gap 16 between the energy transfer units 11, 12 and thereby determines a maximal charge and/or discharge output. The control and regulation unit 17 adjusts the gap 16 and thus the motor vehicle height 14 by the length 28, 29 of the chassis components 19, 20, wherein the control and regulation unit 17 has determined the maximum charge and/or discharge output. To that end, the control and regulation unit 17 adjusts the number of operating resources in the operating resource volumes of the chassis components 19, 20 using an operating resource pump (not depicted), from which the length 28, 29 of the chassis component 19, 20 results.

In the control operating mode, the control and regulation unit 17, for the charging and/or discharging process, adjusts the gap 16 to the charge level independently from the charge and/or discharge output of the charge and discharge device 10. In the control operating mode, for the charging and/or discharging process, the control and regulation unit 17 adjusts the charge level to a fixed value of the charge level. The fixed value of the charge level is stored in the control and regulation unit 17. The fixed value of the charge level is smaller than the gap 16 between the energy transfer units 11, 12 when the motor vehicle is being driven.

In the control operating mode, the control and regulation unit 17, for the charging and/or discharging process of the battery device, adjusts the length 28, 29 of the chassis components 19, 20 and thus the gap 16 between the energy transfer units 11, 12 to the fixed value of the charge level. The control and regulation unit 17 adjusts the fixed value of the charge level and thus the gap 16 and the motor vehicle height 14 with the length 28, 29 of the chassis components 19, 20. To that end, the control and regulation unit 17 adjusts the number of operating resources in the operating resource volumes of the chassis components 19, 20 using the operating resource pump, from which the length 28, 29 of the chassis components 19, 20 results.

Essentially, the control and regulation unit 17 can have only the regulatory operating mode or only the control operating mode. It is moreover also possible for the adjustment unit 15 to only have one operating unit with which a driver or operator of the motor vehicle can manually operate the motor vehicle level-adjustment unit 13, in order to manually adjust the gap 16 to the charge level by means of the motor vehicle level-adjustment unit 13 for the charging and/or discharging process.

To control and to regulate the charge level using the control and regulation unit 17, the motor vehicle device has a sensor system (not depicted). The sensor system is, among other things, provided to detect the gap 16, the ride height 27, the charge and/or discharge output and to automatically identify a producible inductive coupling between the vehicle-side energy transfer unit 11 and the external energy transfer unit 12, i.e. to automatically identify a position of the motor vehicle in which both energy transfer units 11, 12 can be coupled together. To that end, the sensor system comprises several sensors. The control and regulation unit 17 is connected to the sensors of the sensor system via communication lines.

During the identification of the producible inductive coupling of the vehicle-side energy transfer unit 11 with the external energy transfer unit 12, the control and regulation unit 17 adjusts the gap 16 to the charge level, for example after the motor vehicle has been locked by the driver or operator, and activates the charging and/or discharging process automatically.

It is naturally also possible for the sensor system to alternatively or additionally identify further parameters, such as the battery device charging status, charging current, charging voltage, battery device temperature, charging time etc. Essentially, the adjustment of the gap 16 to the charge level and/or the activation of the charging and/or discharging process to only be carried out or introduced manually by the driver or operator and/or released by the driver or operator. It is moreover also possible for the motor vehicle device to additionally have additionally kinematics for moving the vehicle-side energy transfer unit 11, which additionally adjusts the vehicle-side energy transfer unit 11 relative to the motor vehicle body 18, in particular with respect to height, and thus the gap 16 can be adjusted to the charge level using the motor vehicle level-adjustment device 13 and/or using the kinematics of the vehicle-side energy transfer unit 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An electric or hybrid motor vehicle device, comprising:
    a charge or discharge unit, which has a vehicle-side energy transfer unit configured for touch-free coupling with a corresponding external energy transfer unit for charging or discharging at least one battery device;
    a motor vehicle level-adjustment unit configured to adjust at least two different motor vehicle heights; and
    an adjustment unit configured to adjust a gap between the vehicle-side energy transfer unit and the corresponding external energy transfer unit to a charge level by means of the motor vehicle level-adjustment unit during a charging or discharging proces,
    wherein the adjustment unit comprises a control unit configured for automatic or partially automatic adjustment of the charge level by means of the motor vehicle level-adjustment unit,
    wherein the control unit has a regulatory operating mode configured to adjust the charge level for the charging or discharging process depending at least on a charge or discharge output of the charge or discharge unit.

2. The electric or hybrid motor vehicle device according to claim 1, wherein the control unit has a control operating mode configured to adjust the charge level for the charging or discharging process independent of a charge or discharge output of the charge or discharge unit.

3. The electric or hybrid motor vehicle device according to claim 2, wherein the control unit is configured, at least in the control operating mode, to adjust the charge level for the charging or discharging process to a fixed value of the charge level.

4. The electric or hybrid motor vehicle device according to claim 1, wherein the charge or discharge unit comprises a sensor system and the control unit is configured to activate the charging or discharging process automatically, depending on the sensor system.

5. The electric or hybrid motor vehicle device according to claim 1, wherein a motor vehicle body is connected tightly to the vehicle-side energy transfer unit.

6. The electric or hybrid motor vehicle device according to claim 1, wherein the motor vehicle level-adjustment unit is configured to operate hydraulically or pneumatically and the adjustment unit is configured to adjust at least one operating resource parameter of the motor vehicle level-adjustment unit.

7. The electric or hybrid motor vehicle device according to claim 1, wherein the motor vehicle level-adjustment unit has at least one chassis component configured to adjust the charge level.

8. A method for adjusting a gap between a vehicle-side energy transfer unit and a corresponding external energy transfer unit for charging or discharging at least one battery device of a motor vehicle device, the method comprising:
    adjusting, by an adjustment unit, the gap between the vehicle-side energy transfer unit and the corresponding external energy transfer unit by altering a height of the motor vehicle,
    wherein in a regulatory charging operating mode the height of the motor vehicle is adjusted to a particular height depending at least on a charge or discharge output of a charge or discharge unit.

9. The method according to claim 8, wherein the gap adjustment is performed automatically or partially automatically.

10. The method according to claim 9, wherein in a control charging operating mode the gap adjustment is performed independent of the charge or discharge output of the charge or discharge unit.

11. The method according to claim 10, wherein in the control charging operating mode the gap is adjusted to a fixed gap distance.

12. The method according to claim 8, further comprising:
    automatically activating the charging or discharging process automatically.

* * * * *